United States Patent [19]

Kapl et al.

[11] Patent Number: 5,433,774
[45] Date of Patent: Jul. 18, 1995

US005433774A

[54] FRICTION LINING AND PROCESS FOR THE PRODUCTION THEREOF

[75] Inventors: Gerhard Kapl, Linz, Austria; Rudolph Hinterwaldner, Munich, Germany

[73] Assignee: Miba Frictec Gesellschaft m.b.H., Austria

[21] Appl. No.: 153,129

[22] Filed: Nov. 15, 1993

Related U.S. Application Data

[63] Continuation-in-part of Ser. No. 739,688, Feb. 8, 1991, abandoned.

[30] Foreign Application Priority Data

Aug. 2, 1990 [DE] Germany ............ 40 24 547.0

[51] Int. Cl.⁶ ............................................. C09K 3/14
[52] U.S. Cl. ..................................... 106/36; 106/600; 106/623; 106/626
[58] Field of Search ............... 106/36, 287.34, 600, 106/611, 623, 626

[56] References Cited

U.S. PATENT DOCUMENTS

| | | |
|---|---|---|
| 2,877,198 | 3/1959 | Morrissey . |
| 2,951,280 | 9/1960 | Spokes et al. . |
| 3,522,066 | 7/1970 | Forsyth ................ 106/600 |
| 3,533,816 | 10/1970 | Oken .................... 106/600 |
| 3,655,609 | 4/1972 | Evans et al. ........... 106/36 |
| 3,712,941 | 1/1973 | Myers .................... 106/600 |
| 3,745,126 | 7/1973 | Moore, Jr. ............. 106/36 |
| 4,019,912 | 4/1977 | Augustin ................ 106/36 |
| 4,122,031 | 10/1978 | Smith .................... 106/36 |
| 4,317,684 | 3/1982 | Hooykaas ............... 106/36 |
| 4,483,713 | 11/1984 | Motoki .................. 106/623 |
| 4,533,393 | 8/1985 | Neuschaeffer et al. .. 106/600 |
| 4,780,142 | 10/1988 | Rechter ................. 106/600 |
| 4,906,297 | 3/1990 | Breen .................... 106/600 |

FOREIGN PATENT DOCUMENTS

| | | |
|---|---|---|
| 959938 | 8/1947 | France . |
| 2319596 | 6/1976 | France . |
| 566741 | 12/1932 | Germany . |
| 2610233 | 3/1976 | Germany . |
| 2808174 | 2/1978 | Germany . |
| 3303696 | 2/1983 | Germany . |
| 024776 | 8/1982 | Japan . |
| 106687 | 10/1984 | Japan . |
| 2239617 | 7/1991 | United Kingdom ............. 106/600 |
| 00930 | 7/1987 | WIPO . |
| 08685 | 3/1989 | WIPO . |

*Primary Examiner*—Helene Klemanski

[57] ABSTRACT

A friction lining comprising an inorganic silicate-containing binder without resin binder components, comprising a mixture of finely divided $SiO_2$ (constituent a) and at least partially water-soluble silicates (constituent b). The mixture of constituent a and constituent b are cured in the presence of water at low temperatures, thereby forming a three-dimensional inorganic polysilicate matrix. Heterogeneous additive particles are incorporated into the three-dimensional inorganic polysilicate matrix during curing of the mixture at low temperatures, thereby forming a solid body with the additive particles serving as fillers, sliding agents, lubricants or coefficient of friction modifiers. These additive particles do not include resin binder forming agents.

52 Claims, No Drawings

FRICTION LINING AND PROCESS FOR THE PRODUCTION THEREOF

CROSS REFERENCE TO RELATED APPLICATION

This application is a Continuation-In-Part application of U.S. patent application Ser. No. 739,688, filed Feb. 8, 1991, now abandoned.

BACKGROUND OF THE INVENTION

FIELD OF THE INVENTION

The present invention relates to a friction lining, comprising an inorganic silicate-containing binder matrix into which additives are integrad, as well as a process for the production thereof.

DESCRIPTION OF THE RELATED ART

Friction linings are used to produce brake shoes, brake linings and clutch linings that are used primarily in brakes and clutches of motor vehicles, rail vehicles and aircraft, and mechanical appurtenances.

In addition, there are also other applications in the technical field, for example as friction linings of synchronizer rings, axle brakes for tractors, and the like.

Friction linings are exposed to severe stresses during use, and cannot be utilized economically unless they have a long service life. As a result they must exhibit, at various sliding velocities, a constant coefficient of friction which must also remain unchanged over a wide range of pressures. Good temperature stability is also necessary since in brake linings in particular, temperatures in excess of 800° C. can occur.

Friction linings are constructed as multicomponent systems, with the individual components being composed of reinforcing agents, fillers, sliding agents and lubricants, and coefficient of friction modifiers, all of which are incorporated in a uniformly distributed manner in a binder matrix. In the production of friction linings, novolak resins are usually used as the binder constituting the binder matrix. In addition to novolak-based binders, phenol and cresol resoles are also used. When substances prepared in the wet state are used, resoles containing solvents and water are predominant. An important parameter for these fluid binders is that they have a high impregnation capability, uniform drying and setting rates, and good compatibility with any rubber modifiers that might be utilized. A disadvantage of plastic-based binders is that they do not possess sufficient temperature stability. For example in a friction lining that serves as a disc brake lining, one critical parameter is its "fade" characteristics. When a vehicle is braked from a predetermined speed many times in quick succession, the pedal force required to maintain a constant braking distance continually increases, since during each braking operation, the coefficient of friction decreases from a temperature-dependent initial coefficient of friction to an increasingly lower ultimate coefficient of friction (definition of brake fade). In order to additionally be able to achieve as little squealing and rubbing as possible in such disc brake linings, it has become known practice to flexibilize the binder systems with elastomers or to improve shear resistance by adding epoxy or melamine resins. This has the disadvantage, however, that the temperature stability decreases considerably because of the increased proportion of plastics. A further disadvantage in terms of a process for producing such friction linings is that the actual shaping and curing requires complex production engineering. Especially in what is called "hot curing," in which the compacts are processed at high pressure (at 4,000 to 8,000 kN), for example in what is called "multistory pressing," there is no guarantee that uniform pressure will be exerted on the compacts, so that high internal stresses can then occur in the material. Especially disadvantageous in this procedure are the relatively high shrinkage values encountered with the use of polycondensing phenol and novolak resins, which generate very high contraction stresses in the friction lining. The temperature resistance of these resins during use is limited, especially when they are used as brake linings, in which continuous peak values of 500° to 1000° C. can be attained - sometimes for long periods of time - under heavy loads. This then has a negative effect on the aforementioned fading characteristics.

Friction linings of this kind have the further disadvantage that they exhibit extremely high wear at high temperatures.

An additional disadvantage is the fact that the processing of phenol-containing binders represents a hazard to the environment and to persons working in the production process. In addition to expensive disposal provisions at the workplace, exhaust air must also undergo special and costly treatment. It is also conceivable that in the future, worn-out friction linings will need to be disposed of as special waste, at extremely high cost.

It is already a known practice to produce, in addition to friction materials using plastic binders, friction linings made from sintered metal, obtained especially by sintering metal powders. Although such sintered linings have relatively high temperature resistance, many service limitations result from their high density. Brake linings made of sintered metal embody a risk of welding to the counterpart material, for example to the metal of the brake disc. Moreover this production method is complex and expensive.

The U.S. Pat. No. 4,019,912 discloses the practice of configuring a friction lining by mixing an inorganic, silicate-containing substance with reinforcing fibers made of carbon-containing material, and producing a friction lining from this substance in an inert gas atmosphere and by heating it to temperatures above 900° C. and with the application of a very high pressure (400 kp/cm$^2$). Because of the high temperature and the high pressures that must be applied, this production procedure is extremely costly in terms of equipment and is not suitable for the production of brake linings, since at these high temperatures organic fiber materials or organic fillers or reinforcing agents will pyrolyze.

WO 89/08685 teaches a friction pad, i.e. a brake pad comprising a synthetic resin such as phenolic resin and glass particles in a sufficient quantity to act as a high temperature binder. The friction pad may also contain other desired ingredients which are normally used, such as lubricants, fillers and friction modifiers. The friction pad is manufactured in a usual manner, i.e. the liquid synthetic resin is mixed with the additives, and the liquid mass is poured into a steel mold, compacted with high pressure, and the liquid phenolic resin is cured at temperatures of about 160° C. for forming a solid three-dimensional resin matrix. The solid glass particles are integrated into the three-dimensional cured phenolic resin matrix. In a second processing step, the entire pad body is heated up to a temperature (500°-900° C.) allowing the glass particles to coalesce, for forming a glass refractory matrix. The problem is that the first matrix of cured phenolic resin cannot disappear during the second process step but can only disintegrate, thereby converting into a matrix of a coal-like structure due to the high-temperature disintegrating process of the cured phenolic resin. The inorganic matrix built up by the sintering glass particles, which sintering process is a physical process and not a chemical process, has nevertheless the properties of glass, and not the properties of a three-dimensional inorganic matrix built up by a chemical reaction process. To ensure that the integrity of the pad is maintained in the second processing step, it is necessary to add additionally "intermediate stage binders". This means it is necessary to build up an intermediate third matrix to maintain the body of the friction lining during the initial integrating process of the cured phenol resin and before a sintering the glass particles takes place.

This production process is, because of its high temperatures and its high pressure extremely costly in terms of equipment.

Further friction linings utilizing silicate-containing inorganic binders in addition to organic binders with the application of high temperature and high pressure are disclosed in the following documents: JP-A-59-24776, JP-A-61-106687, DE-A-2 610 233, DE-A-3 303 696, and DE-A-2 808 174.

SUMMARY OF THE INVENTION

It is an object of the present invention to provide a friction lining which is easily produced, without the use of high pressures and high temperatures during the curing process, with the resulting friction lining exhibiting good mechanical properties, and in particular good fade characteristics, high temperature stability and a long service life.

It is a further object of the present invention to provide a process for producing a friction lining comprising an inorganic silicate-containing binder matrix without the use of additional inorganic resins binders or intermediate binders.

It is a further object of the present invention to provide a process for producing a friction lining which is conducted at low temperatures and without the need for high pressure equipment. These and other objects are achieved according to the invention by a friction lining comprising an inorganic silicate-containing binder without resin binder components, comprising a mixture of finely divided $SiO_2$ (constituent a) and at least partially water-soluble silicates (constituent b). The mixture of constituent a and constituent b are cured in the presence of water at low temperatures, thereby forming a three-dimensional inorganic polysilicate matrix. Heterogeneous additive particles are incorporated into the three-dimensional inorganic polysilicate matrix during curing of the mixture at low temperatures, thereby forming a solid body with the additive particles serving as fillers, sliding agents, lubricants or coefficient of friction modifiers. These additive particles are exclusive of resin binder forming agents.

DETAILED DESCRIPTION OF THE INVENTION

It has been observed that the mixture of finely divided components without organic resin binder components has very high reactivity. A polycondensation takes place in the presence of water - without the application of high temperatures and high pressures - and immediately leads to ready-to-use friction materials. During said curing of said mixture at low temperatures, a solid body is formed. The water itself does not participate in the reaction, but simply acts as a reaction vehicle and then evaporates off.

The resulting binder matrix, which is made up of a three-dimensional silicate lattice structure, ensures first of all outstanding mechanical stability for the friction lining, and also extremely high temperature resistance. Moreover, heterogeneous additives particles, such as fillers, sliding agents and lubricants, and coefficient of friction modifiers can be incorporated in a finely dispersed manner in the silicate matrix, and said additive particles do not contain resin binder forming agents. It has been found, surprisingly, that in friction linings that are provided with the silicate-containing binder matrix according to the present invention, reinforcing agents in the form of fibers are no longer necessary in many kinds of applications. For example, in brake linings it is possible to dispense with the addition of fibers, especially asbestos fibers.

With the silicate-containing binder matrix according to the present invention it is also possible to achieve temperature resistance values of over 1000° C., and temperature resistance values of up to 1500° C. can be observed. Additional advantages are the fact that the binder matrix is not flammable. In addition, the silicate framework has excellent resistance to solvents, greases, oils, fuels of all kind, and strong bases and acids. In addition to the extremely high hardness of the binder matrix, a high bending strength (e.g. up to 30 MPa), high compression strength (e.g. up to 90 MPa), high modulus of elasticity, and high level of vibration damping are evident.

Moreover, the silicate binder matrix has a very low coefficient of thermal expansion (approximately 4 to $9 \times 10^{-6} K^{-1}$). Moreover, extremely low shrinkage and creep properties have been observed, considerably lower than in friction linings which use plastic binders. Moreover, very high dimensional stability under alternating temperature loads has been noted. As compared with sintered metal linings, lower specific weights are evident. In addition, the silicate matrix is environmentally benign, so that no disposal problems occur.

The advantages in terms of production are that low processing temperatures (below 120° C.) are possible, and processing without inert gases or solvents is possible. The only solvent required is water for paste preparation, some of which can be incorporated in the matrix during the crosslinking reaction, and some of which evaporates in the course of subsequent curing steps. The starting substance can be poured, extruded, or pressed, so that all the usual processing technologies can be utilized. The curing step itself, which is assisted by heat energy, occurs without compression, therefore no highly sophisticated equipment is necessary to produce the friction linings.

Polycondensation of the mixture of finely divided $SiO_2$ and at least partly water-soluble silicates results in a three-dimensionally branched binder matrix with a regular structure, ensuring outstanding quality and service life for the friction lining. These starting materials moreover exhibit a good wetting ratio, i.e. the additives that are to be simultaneously incorporated into the binder matrix adhere uniformly and in a finely divided manner to the starting substances, and can be uniformly incorporated into the binder matrix in an equally finely dispersed manner. This ensures, for example, that the friction lining has the same properties on the friction surface under every abrasion condition.

Reactive constituents suitable for the production of the binder matrix according to the present invention are amorphous $SiO_2$, possibly $Al_2O_3$, and, if present, the undissolved $SiO_2$ of amorphous hydrous silicic acid. Especially preferred are mixtures of amorphous $SiO_2$ and $Al_2O_3$, which can be present at weight ratios of $SiO_2$ to $Al_2O_3$ in the range 5-98 wt% $SiO_2$: 95-2 wt% $Al_2O_3$, preferably 5-80 wt%: 95-20 wt%.

The $SiO_2$ is preferably present in amorphous, especially in anhydrous form. This form is also preferred for the finely divided mixture of $SiO_2$ and $Al_2O_3$, although $Al_2O_3$ can also be present partly in, for example, crystalline form. The $SiO_2$ can also be derived from amorphous hydrous silicic acid. The oxides can contain contaminants such as iron, sodium, potassium, calcium, etc. Furthermore, the oxides may contain anhydrous oxides of Be, Mg, Ca, Sr or Ba. The oxide constituents, namely $SiO_2$ and/or $Al_2O_3$, are present in proportion to the water-soluble silicates in a ratio of 80 to 20: 5 to 60, especially on the quantitative order of 15 wt%, referred to the total mixture of the two constituents. Suitable as especially reactive constituents are dusts from high-temperature smelting processes, filter dusts, electrostatic filter ash from high-temperature power plants, and calcined and ground bauxite.

Particularly advantageous are those reactive constituents alone or in conjunction with the aforementioned polycondensating constituents, that set hydraulically. These include the clinker phases from cement production, such as for example alite ($C_3 S$) and tricalcium aluminate ($C_3 A$) (where C=calcium oxide, S=silicon dioxide, and A=aluminum oxide), aluminous cement, anhydrides, gypsum, and anhydrous alkaline-earth and magnesium oxides.

Especially suitable as the partially water-solube silicates that act as curing agents for the $SiO_2$ and $Al_2O_3$ oxides are alkaline or ammonium silicates, which can be used alone or in mixtures. They generally possess an excess of free alkali and/or ammonium. The molar ratio between alkali or ammonium and silicon oxide is generally between 1.0 and 5 mol, preferably between 1.2 and 4 mol $SiO_2$ per mol alkali or ammonium. Especially preferred are potassium and/or ammonium silicate, because they impart especially good and homogeneous physical properties to the structure-forming matrix, and incorporate the necessary additives very well. The alkaline or ammonium silicates can also be present in aqueous form as prepared solutions.

In an especially advantageous manner, instead of the silicates of their constituent components, namely the corresponding oxides or hydroxides of the alkali or the ammonium, and amorphous hydrous silicic acids in the form of dispersed powders can also be included.

This feature has the advantage that these silicate precursors are easy to store as solids, and can be made into a paste with water just before processing.

In an especially advantageous manner, salts or fluorosilicic acid, alone of in conjunction with the aforementioned alkaline silicates, can be used as curing agents. This means the mixing step further includes, upon mixing said intimate, homogeneous mixture of constituents a and b, mixing additional salts of fluorosilicic acids with said mixture. These compounds are of the general formula:

$M_2^I[SiF_6]$, wherein $M^I$ is a monovalent metal.

Examples include alkaline and alkaline-earth fluorosilicates such as sodium and barium hexafluorosilicates. Organic fluorosilicates are also suitable, such as bis(methylammonium) fluorosilicate, bis(dibutylammonium) fluorosilicate, and dianilinium fluorosilicate. The addition salts of fluorosilicic acids and organic fluorosilicates are mixed into the mixture containing the other constituents.

The binder matrix according to the present invention results from either a hydraulic and/or a polycondensing process. Not only can these curing mechanisms be used to produce one- and two-component friction lining systems, but the setting parameters can also be varied within relatively wide limits. These parameters include the "pot life" and the green and ultimate strength values.

Since, in the polycondensing substances according to the present invention that constitute the binder matrix, water functions only as a vehicle and wetting agent, it can be used in combination systems to activate the hydraulically setting substances that bind the binder matrix, resulting in faster green strength.

Additives that are specially suitable for incorporation into the binder matrix according to the present invention are the following, which additives are present in a quantitative ratio of 1–50 wt-% compared to the remaining substances:

Fillers:
  Wollastonite, mica, barium sulfate, calcium sulfate, powdered metals such as those made of iron, copper and their alloys.
Sliding agents and lubricants:
  Graphite, boron nitride, molybdenum disulfide, copper sulfide, antimony sulfide and other metal sulfides; fluoropolymers such as polytetrafluoroethylene. The sliding agents and lubricants are preferably present in the form of powders, granules, or the like.
Coefficient of friction modifiers:
  Inorganic sulfates such as barium sulfate, inorganic cabonates such as calcium carbonate, inorganic oxides such as silicon dioxide; cashew dust, rubber dust, cork powder, or the like.

As previously mentioned, for many types of uses reinforcing agents are no longer needed. Reinforcing agents in the form of fibers can nevertheless be added if required in certain applications.

Examples of inorganic fibers are:
  Glass fibers, carbon fibers, rock wools, metal wools, titanate fibers, aluminum silicate and aluminum oxide fibers, ceramic fibers, silicon carbide fibers, and fibers made from iron and copper and their alloys.
Examples or organic fibers are:
  Polyamide, polyacrylonitrile, polyester, phenol, aramid, cotton, and cellulose fibers, and the like.

In various applications for friction linings, porous structures are often required in order to perform sound-damping and heat-insulating functions and/or in order to reduce inherent weight. In "wet-running" friction linings, pores must be present for oil absorption. One embodiment of the invention therefore provides for self-supporting structural foams to be produced by the addition, before or during the setting process, of blowing and/or expanding agents. Foam-forming constituents releasing gases on contact with water are mixed with the mixture during said mixing step. Suitable blowing and/or expanding agents according to the present invention include peroxy compounds such as hydrogen peroxide, persulfates, perborates, percarbonates, organic peroxides such as dibenzoyl peroxide, or those compounds which form gases or foam up in contact with water, such as carbides, aluminum powders, metal hybrides, hydrazine dervatives, semicarbazides, or the like. Foams can also be generated by introducing gases such as air, nitrogen, or carbon dioxide during the pot time phase. These foams can be open- or closed-cell, so that they can cover a wide range of applications.

It is also possible to produce pore structures by adding, as pore formers, powders or fibrous substances that evaporate, melt out, or shrink during curing.

Furtherthemore, additional fillers such as pigments, dyes, thixotropic agents or other additives to regulate rheological properties, wetting, or the like can be added to the friction materials according to the present invention.

In the process according to the present invention, the procedure is preferably such that the intimate, homogeneous mixture of the starting constituents—$SiO_2$ and at least partially water-soluble silicates—and the necessary additives is made with water into a paste of workable consistency or that the starting constituents are first processed with water and then the necessary additives are added, forming a pourable, pasty consistency, and the substance is then cured, after shaping if applicable. The curing substances can also be applied onto a support made of metallic, inorganic, or organic materials, thereby providing during curing an intimate bond between the support material and said curing mass. Such support materials can be steels, iron, wood, stone, concrete, plastics such as thermosetting resins or thermoplastics, or the like.

Provision is also made for the shaped and cured friction linings to be joined to the support material by adhesive bonding. For high-temperature applications a high-temperature adhesive, especially a silicate-based one, is used, which in each case results in an intimate bond between the friction lining and support material.

In producing the compact substance for a friction lining, the substance can be degassed beforehand by means of vacuum. Degassing can also, however, be performed on the preshaped castings or on the friction lining coating by vibration or by evacuation.

Water or an aqueous alkaline medium can be used in this connection, for example in quantities of 5-70 wt%, preferably 20-50 wt%, referred to the total dry weight.

The substances made into a paste with water can be processed by pouring, extruding, and pressing.

In the production of compact friction linings, curing takes place for about 1 to 2 hours at $+85°$ C. with an exothermic polycondensation taking place. Drying then occurs at 20° to 50° C. to constant weight, in order to expel the residual retained moisture. If the friction linings are intended for use at high temperature, they are heated in stages to temperatures of $+80°$ to 1500° C., which results in post-curing. For high-temperature applications, heating in stages to above the service temperature is generally required in order to achieve good temperature and dimensional stability. The cured mass, therefore, is after-baked in stages of successively increasing temperatures to above the anticipated utilization temperature.

In the production of porous friction linings, the substances cure at 20° C. in a maximum of 2 hours or at 50° C. in about 1 hour. Post-curing can occur at $+50°$ C. to $+100°$ C. If the porous friction linings are also intended for high-temperature use, they are also heated in stages to temperatures of up to 1100° C.

It was discovered, surprisingly, that staged post-curing of the friction linings produced especially low abrasion values.

If necessary, the friction linings can also be made hydrophobic; for example, silanes, polydimethoxysilanes, or the like are suitable for this purpose.

Because of the low processing temperatures, the inorganic means according to the present invention for producing the binder matrix result in an extraordinarily wide range of variation, simply because all the above additives and others can easily be integrated into the structural matrix.

A few selected practical examples of friction linings according to the invention and of their production are described in more detail with reference to the following practical examples.

The production process makes use of the following oxide mixtures, which may be regarded as reagents:

(1) 25 wt % $SiO_2$
    75 wt % $Al_2O_3$
(2) 30 wt % $SiO_2$
    70 wt % $Al_2O_3$
(3) 40 wt % $SiO_2$
    70 [sic] wt % $Al_2O_3$ The following mixtures are used as curing solutions:

(1) 20.00 wt % $SiO_2$
    20.88 wt % $K_2O$
    59.12 wt % water
(2) 20.00 wt % $SiO_2$
    20.88 wt % $Na_2O$
    59.12 wt % water
(3) 19.75 wt % $K_2O$
    26.08 wt % $SiO_2$
    1.15 wt % $NH_4OH$
    53.02 wt % water

EXAMPLE 1

366 parts by weight (pbw) of curing agent (1) are placed in a 2-liter container. Into this, 366 pbw of solid (1) are then mixed with a high-speed stirrer. Then 83 pbw of granulated graphite, 166 pbw of copper powder, and 119 pbw of cotton fibers were incorporated into the homogeneous binder substance. Then the pourable substance was poured into a mold made of silicone rubber and cured for 90 minutes at 85° C. Then the friction lining formulation was dried to constant weight for 2 hours at 50° C.

EXAMPLE 2

As a modification to Example 1, only 230 pbw of curing agent (2) were placed in the container, and 440 pbw of solid (1) were incorporated. The remaining additives and their quantities corresponded to Example 1; the same is true of curing.

EXAMPLE 3

246 pbw of solid (2) were incorporated into 246 pbw of curing agent (3) with a high-speed stirrer. Then 246 pbw of copper powder and 268 pbw of granulated graphite were incorporated. After shaping into a compact, the substance was cured at 85° C. for 1 hour. Post-curing took place at 150° C., 200° C. and 220° C., for 1 hour at each temperature.

EXAMPLE 4

335 pbw of solid (3) were homogeneously incorporated into 270 pbw of curing agent (1) with a high-speed stirrer. Then 136 pbw of copper powder and 263 pbw of granulated graphite were added. The compact produced from this substance was cured for 1 hour at 85° C. Post-curing took place at 150° C., 250° C. and 280° C., for 1 hour at each temperature.

EXAMPLES 5 to 10

In Examples 5 to 10 the procedure corresponded to Example 1. The friction linings had the following composition:

| Raw materials (wt %) | | 5 | 6 | 7 | 8 | 9 | 10 |
|---|---|---|---|---|---|---|---|
| Reagent | (1) | 27 | — | — | — | 25 | — |
|  | (2) | — | 27 | — | 33 | — | 26 |
|  | (3) | — | — | 34.2 | — | — | — |
| Curing agent | (1) | 18 | — | — | 22 | — | — |
|  | (2) | — | — | 22.8 | — | — | — |
|  | (3) | — | 27 | — | — | 25 | 26 |
| Granulated graphite | | 30 | 18 | 15 | 20 | 18 | 20 |
| Powdered PTFE | | — | — | 8 | — | — | — |
| Powdered iron | | 20 | 20 | 15 | — | 10 | 15 |
| Steel fibers | | — | — | — | 15 | — | — |
| Glass fibers | | — | 10 | — | — | — | — |
| Aramid fibers | | — | 8 | — | 5 | 6 | — |
| Carbon fibers | | — | — | — | — | 12 | 13 |
| Powdered rubber | | — | — | 5 | — | — | — |
| Barium sulfate | | — | — | — | 5 | 4 | — |
| Cashew dust | | 5 | — | — | — | — | — |
| Curing temperature (°C.) | | 80 | 85 | 90 | 100 | 85 | 85 |
| Post-curing up to (°C.) | | 120 | 300 | 250 | 300 | 200 | 1500 |

We claim:
1. A friction lining comprising
   an inorganic silicate-containing binder without organic resin binder components, comprising a mixture of
   constituent a, including finely divided SiO$_2$;
   constituent b, including at least partially water-soluble silicates, said mixture of said constituent a and said constituent b having been cured in the presence of water at low temperatures, thereby forming a three-dimensional inorganic polysilicate matrix; and
   heterogeneous additive particles, said particles being incorporated into the three-dimensional inorganic polysilicate matrix during said curing of said mixture at low temperatures, thereby forming a solid body, said additive particles serving as fillers, sliding agents, lubricants or coefficient of friction modifiers, said additive particles not substantially including, and being essentially free of, resin binder forming agents.

2. The friction lining according to claim 1, wherein the ratio between constituents a and b is 80 to 20: 5 to 60.

3. The friction lining according to claim 1, wherein constituent a of said mixture comprises a mixture of finely divided SiO$_2$ and Al$_2$O$_3$.

4. The friction lining according to claim 3, wherein the weight ratio of SiO$_2$ to Al$_2$O$_3$ is 5–98 wt-% SiO$_2$ and 95-2 wt-% Al$_2$O$_3$.

5. The friction lining according to claim 4, wherein the weight ratio SiO$_2$ to Al$_2$O$_3$ is 5–80 wt-% SiO$_2$ and 95-20 wt-% Al$_2$O$_3$.

6. The friction lining according to claim 1, wherein said constituent a further contains dusts, selected from the group consisting of dusts from high-temperature smelting processes, filter dusts, electrostatic filter ash from high-temperature power plants, and calcined bauxite.

7. The friction lining according to claim 1, wherein said constituent a of said mixture contains at least partially insoluble SiO$_2$ from amorphous hydrous silicic acids in dispersed powder form.

8. The friction lining according to claim 1, wherein said constituent a of said mixture additionally contain anhydrous oxides of elements consisting of the group of Be, Mg, Ca, Sr, Ba.

9. The friction lining according to claim 1, wherein said constituent a of said mixture additionally contains clinker phases from cement production.

10. The friction lining according to claim 9, wherein said clinker phases are selected from the groups consisting of alite and tricalcium silicates.

11. The friction lining according to claim 1, wherein said at least partially water-soluble silicates of constituent b are silicates selected from the group consisting of alkaline and ammonium silicates.

12. The friction lining according to claim 1, wherein said at least partially water-soluble silicates of constituent b are provided in the form of alkali precursors.

13. The friction lining according to claim 12, wherein said alkali precursors are in the form of solid alkaline hydroxide in amorphous hydrous silicic acid being in dispersed powder form.

14. The friction lining according to claim 12, wherein the molar ratio between alkali and silicon dioxide is between 1 and 5 mol SiO$_2$ per mol alkali.

15. The friction lining according to claim 14, wherein the molar ratio between alkali and silicon dioxide is between 1.2 and 4 mol SiO$_2$ per mol alkali.

16. The friction lining according to claim 1, wherein said at least partially water-soluble silicates of constituent b are provided in the form of ammonium precursors.

17. The friction lining according to claim 16, wherein the molar ratio between ammonium and silicon dioxide is between 1 and 5 mol SiO$_2$ per mol ammonium.

18. The friction lining according to claim 17, wherein the molar ratio between ammonium and silicon dioxide is between 1.2 and 4 mol SiO$_2$ per mol ammonium.

19. The friction lining according to claim 1, further comprising constituent c) in said mixture, said constituent c including salts of fluorosilicic acids.

20. The friction lining according to claim 19, wherein said constituent c consists at least partially of salts of fluorosilicic acids with a general formula $M_2^I[SiF_6]$, wherein $M^I$ is a monovalent metal.

21. The friction lining according to claim 1, further comprising constituent c) in said mixture, said constituent c including organic fluorosilicates.

22. The friction lining according to claim 1, wherein said additives are present in a quantative ratio of 1–50 wt-% compared to the remaining substances.

23. The friction lining according to claim 1, wherein said additives are fillers selected from the group consisting of wollastonite, mica, barium sulfate, calcium sulfate, and powdered metals.

24. The friction lining according to claim 1, wherein said additives are sliding agents and lubricants selected from the group consisting of graphite, boron nitride, molybdenum disulfide, copper sulfide, antimony sulfide and fluoropolymers, said additives being in the form of powders and granules.

25. The friction lining according to claim 1, wherein said additives are coefficient of friction modifiers selected from the group consisting of inorganic sulfates, inorganic carbonates, inorganic oxides, cashew dust, rubber dust and cork powder.

26. The friction lining according to claim 1, wherein said additives are fibers selected from the group consisting of glass fibers, carbon fibers, rock wools, metal wools, titanate fibers, aluminium silicate fibers, aluminium oxide fibers, ceramic fibers, silicon carbide fibers, fibers made from iron, fibers made from copper, fibers made of alloys of iron and copper, polyamide fibers, polyacrylonitrile fibers, polyester fibers, phenol fibers, aramid fibers, cotton fibers, and cellulose fibers.

27. The friction lining according to claim 1, further comprising foam-forming constituents releasing gases on contact with water.

28. A friction lining comprising
a support material;
an inorganic silicate-containing binder without organic resin binder components, comprising a mixture of
constituent a, including finely divided $SiO_2$;
constituent b, including at least partially water-soluble silicates, said mixture of said constituent a and said constituent b having been cured in the presence of water at low temperatures, thereby forming a three-dimensional inorganic polysilicate matrix; and
heterogeneous additive particles, said particles being incorporated into the three-dimensional inorganic polysilicate matrix during curing said mixture at low temperatures, thereby forming a solid body, said additive particles serving as fillers, sliding agents, lubricants or coefficient of friction modifiers, said additive particles not substantially including, and being essentially free of, resin binder forming agents, said matrix being mounted upon said support member; and
a high-temperature adhesive interposed between said support material and said matrix to secure said matrix to said support material.

29. The friction lining according to claim 28, wherein said high-temperature adhesive is a silicate-based adhesive.

30. The friction lining according to claim 28, wherein said constituent a of said mixture comprises a mixture of finely divided $SiO_2$ and $Al_2O_3$.

31. The friction lining according to claim 30, wherein the weight ratio of $SiO_2$ to $Al_2O_3$ is 5-98 wt-% $SiO_2$ and 95-2 wt-% $Al_2O_3$.

32. The friction lining according to claim 31, wherein the weight ratio $SiO_2$ to $Al_2O_3$ is 5-80 wt-% $SiO_2$ and 95-20 wt-% $Al_2O_3$.

33. A process for producing a friction lining comprising an inorganic silicate-containing binder matrix without an organic resin binder matrix into which inorganic silicate-containing binder matrix additives are integrated, comprising the steps of:
mixing constituent a, including finely divided $SiO_2$; and constituent b, including at least partially water-soluble silicates, thereby forming an intimate, homogeneous mixture thereof,
mixing said intimate, homogeneous mixture of constituents a and b with water into a paste of workable consistency;
adding any additives that are to be added to said paste, said additives not substantially including, and being essentially free of, resin binder forming agents; and
curing the resulting mass of said paste at low temperatures.

34. The process according to claim 33, wherein said low temperatures are temperatures below 120° C.

35. The process according to claim 33, wherein said mixing step further includes, upon mixing said intimate, homogeneous mixture of constituents a and b, mixing additional salts of fluorosilicic acids with said mixture.

36. The process of claim 33, wherein said mixing step further includes, upon mixing said intimate, homogeneous mixture of constituents a and b, mixing additional organic fluorosilicates with said mixture.

37. The process according to claim 33, wherein, after curing the said resulting mass, the cured mass is afterbaked in stages of successively increasing temperatures to above the anticipated utilization temperature.

38. The process according to claim 33, wherein foam-forming constituents releasing gases on contact with water are mixed with said mixture during said mixing step.

39. The process according to claim 33, wherein constituent a of said mixture comprises a mixture of finely divided $SiO_2$ and $Al_2O_3$.

40. The process according to claim 39, wherein the weight ratio of $SiO_2$ to $Al_2O_3$ is 5-98 wt-% $SiO_2$ and 95-2 wt-% $Al_2O_3$.

41. The process according to claim 40, wherein the weight ratio $SiO_2$ to $Al_2O_3$ is 5-80 wt-% $SiO_2$ and 95-20 wt-% $Al_2O_3$.

42. A process for producing a friction lining comprising an inorganic silicate-containing binder matrix without an organic resin binder matrix into which inorganic silicate-containing binder matrix additives are integrated, comprising the steps of:
mixing constituent a, including finely divided $SiO_2$; and constituent b, including at least partially water-soluble silicates, thereby forming an intimate, homogeneous mixture thereof;
mixing said intimate, homogeneous mixture of constituents a and b with water into a paste of workable consistency;
adding any additives that are to be added to said paste, said additives not substantially including, and being essentially free of, resin binder forming agents;
placing said paste to be cured upon a support material; and
curing the resulting mass of said paste at low temperatures, providing during curing an intimate bond between said support material and said curing mass.

43. The process according to claim 42, wherein said low temperatures are temperatures below 120° C.

44. The process according to claim 42, wherein constituent a of said mixture comprises a mixture of finely divided $SiO_2$ and $Al_2O_3$.

45. The process according to claim 44, wherein the weight ratio of $SiO_2$ to $Al_2O_3$ is 5-98 wt-% $SiO_2$ and 95-2 wt-% $Al_2O_3$.

46. The process according to claim 45, wherein the weight ratio SiO$_2$ to Al$_2$O$_3$ is 5–80 wt-% SiO$_2$ and 95–20 wt-% Al$_2$O$_3$.

47. A process for producing a friction lining comprising an inorganic silicate-containing binder matrix without an organic resin binder matrix into which inorganic silicate-containing binder matrix additives are integrated, comprising the steps of:

mixing constituent a, including finely divided SiO$_2$; and constituent b, including at least partially water-soluble silicates, thereby forming an intimate, homogeneous mixture thereof;

mixing said intimate, homogeneous mixture of constituents a and b with water into a paste of workable consistency;

adding any additives that are to be added to said paste, said additives not substantially including, and being essentially free of resin binder forming agents;

curing the resulting mass of said paste at low temperatures, and attaching the resulting cured friction lining to a support material by means of a high-temperature adhesive.

48. The process of claim 47, wherein said low temperatures are temperatures below 120° C.

49. The process according to claim 47, wherein said high-temperature adhesive is a silicate-based adhesive.

50. The process according to claim 47, wherein constituent a of said mixture comprises a mixture of finely divided SiO$_2$ and Al$_2$O$_3$.

51. The process according to claim 50, wherein the weight ratio of SiO$_2$ to Al$_2$O$_3$ is 5–98 wt-% SiO$_2$ and 95–2 wt-% Al$_2$O$_3$.

52. The process according to claim 51, wherein the weight ratio SiO$_2$ to Al$_2$O$_3$ is 5–80 wt-% SiO$_2$ and 95–20 wt-% Al$_2$O$_3$.

* * * * *